United States Patent [19]
Baker et al.

[11] Patent Number: 5,458,784
[45] Date of Patent: Oct. 17, 1995

[54] REMOVAL OF CONTAMINANTS FROM AQUEOUS AND GASEOUS STREAMS USING GRAPHIC FILAMENTS

[75] Inventors: R. Terry K. Baker; Nelly M. Rodriguez, both of State College, Pa.

[73] Assignee: Catalytic Materials Limited, State College, Pa.

[21] Appl. No.: 374,033

[22] Filed: Jan. 17, 1995

Related U.S. Application Data

[63] Continuation-in-part of Ser. No. 947,416, Sep. 18, 1992, Pat. No. 5,413,866, which is a continuation-in-part of Ser. No. 602,182, Oct. 23, 1990, Pat. No. 5,149,584.

[51] Int. Cl.$^6$ .................................................... B01J 49/00
[52] U.S. Cl. ................... 210/674; 55/527; 55/528; 95/133; 95/141
[58] Field of Search ................... 210/694, 688, 210/674, 797; 95/133, 141, 234; 55/527, 528

[56] References Cited

U.S. PATENT DOCUMENTS 5,021,164  6/1991  Gay .......................................... 210/694

OTHER PUBLICATIONS

"Applications of Graphite Intercalation Compounds" M Inagaki—Journal of Material Research, vol. 4, No. 6 Nov./Dec. 1989.

*Primary Examiner*—James J. Bell

[57] ABSTRACT

A process for removing contaminants, particularly organic and metal contaminants, from aqueous and gaseous streams by contacting a contaminated stream with graphitic carbon filaments (nanofibers) characterized as having; (i) a surface area from about 50 to 800 $m^2/g$, (ii) an electrical resistivity from about 0.3 μohm·m to 0.8 μohm·m, (iii) a crystallinity from about 5% to about 100%, (iv) a length from about 1 μm to about 100 μm; and (v) a distance from about 0.335 nm to about 0.700 nm between graphite platelets.

20 Claims, 2 Drawing Sheets

Polar Group 
Water Molecule 
Organic Molecule or Metal

REMOVAL OF CONTAMINANTS FROM AQUEOUS AND GASEOUS STREAMS USING GRAPHIC FILAMENTS

CROSS REFERENCE TO RELATED APPLICATIONS

This is a continuation-in-part of U.S. Ser. No. 07/947,416 filed Sep. 18, 1992 now U.S. Pat. No. 5,413,866 and which is a continuation-in-part of U.S. Ser. No. 07/602,182 filed Oct. 23, 1990 now U.S. Pat. No. 5,149,584.

FIELD OF THE INVENTION

The present invention relates to a process for removing contaminants, particularly organic and metal contaminants, from aqueous and gaseous streams by contacting a contaminated stream with graphitic carbon filaments (nanofibers) characterized as having; (i) a surface area from about 50 to 800 $m^2/g$, (ii) an electrical resistivity from about 0.3 µohm·m to 0.8 µohm·m, (iii) a crystallinity from about 5% to about 100%, (iv) a length from about 1 µm to about 100 µm; and (v) a distance from about 0.335 nm to about 0.700 nm between graphite platelets.

BACKGROUND OF THE INVENTION

A substantial number of aqueous and gaseous streams contain organic and/or metallic contaminants which must be removed to meet governmental laws and regulations. Non-limiting examples of contaminated aqueous streams include: those emanating from municipal water supplies; those waste water streams resulting from various pharmaceutical, chemical, petrochemical, and refining processes; and, those resulting from various other industries such as the pulp and paper industry. Contaminated ground water streams must also be treated depending on their intended use. Contaminated gaseous streams can contain organic contaminants and/or metal contaminants in the form of metal vapors or vapors of compounds that contain one or more metals.

One type of aqueous stream which has proven difficult to treat in a cost effective manner is an aqueous stream containing relatively low levels of organic components, typically volatile organic components. Such streams are often found in petroleum refineries and chemical plants wherein water is often initially present, or subsequently found in processes for producing various organic chemicals and products therefrom. Metallic contaminants, such as mercury, lead, copper, zinc, and cadmium are also often found in such streams.

Various conventional techniques have been developed for removing such contaminants from aqueous streams, particularly when the contaminants are organic constituents. One such technique involves air stripping. Air stripping techniques typically involve the use of packed, or bubble tray, columns wherein the contaminated aqueous stream is passed counter-current to a flow of air. Organic contaminants pass from the aqueous liquid phase to the gaseous phase owing to the difference in concentration of organics in the two phases. That is, the organic constituents pass from the more concentrated aqueous phase to the less concentrated gaseous phase. The stripped organics are eventually released to the atmosphere with vented air. This of course creates a problem with respect to the release of such contaminants into the environment as air borne contaminants. The instant invention can be used to remove contaminants from both the aqueous and the gaseous phases.

Another conventional technique consists of bubbling air directly into the contaminated aqueous stream by use of diffusers or bubblers. Such a technique has the disadvantage of being able to remove only trace amounts of organics, typically less than about 10 wppm. A source of compressed air is also needed, thereby increasing the capital investment and operating costs for such a technique.

One leading commercial technique for removing organic and metallic contaminants from both aqueous and gaseous streams is adsorption onto a solid adsorbent material, such as activated carbon, preferably oxidized activated carbon. For example, U.S. Pat. No. 5,021,164 teaches a process wherein oxidized activated carbon containing relatively low levels of acidic oxides per unit of carbon is used to remove organic contaminants from an aqueous stream. One disadvantage with the use of conventional activated carbon in aqueous systems is that it quickly becomes saturated with water molecules thereby reducing the available volume for adsorption of undesirable organic molecules.

Consequently, there still remains a substantial need in the art for more efficient and effective processes for removing contaminants from aqueous streams.

SUMMARY OF THE INVENTION

In accordance with the present invention, there is provided a process for removing contaminants such as organic and metal components from aqueous and gaseous streams, which process comprises contacting the contaminated streams with graphitic carbon filaments characterized as having; (i) a surface area from about 50 to 800 $m^2/g$, (ii) an electrical resistivity from about 0.3 µohm·m to 0.8 µohm·m, (iii) a crystallinity from about 5% to about 100%, (iv) a length from about 1 µm to about 100 µm; and (v) a distance from about 0.335 nm to about 0.700 nm between graphite platelets.

In preferred embodiments of the present invention the carbon filaments are of a shape which is selected from the group consisting of branched, spiral, and helical.

In another preferred embodiment of the present invention, the structure has an average crystallinity greater than about 50%.

There is also provided a porous mat comprised of a carbon fiber/filament structure comprised of a primary structure of carbon fibers, or wires, having grown therefrom carbon filaments, wherein substantially all of said filaments form are characterized as set forth above. The contaminated stream is passed through said mat onto which contaminants from the stream are adsorbed.

In still other preferred embodiments of the present invention, the distance between the graphite platelets is about 0.335 nm to about 0.500 nm.

BRIEF DESCRIPTION OF THE FIGURES

FIGS. 1a, 1b, and 1c hereof are simplified drawings of the types of arrangements of graphite platelets which may be present in the carbon filaments of the present invention.

FIGS. 2a and 2b hereof are schematic representations wherein

DETAILED DESCRIPTION OF THE INVENTION

The present invention can be practiced on any aqueous or gaseous stream which contains relatively low levels of organic contaminants. It is preferred that the level of organic contaminants not be more than about 0.5 wt.%, preferably not more than about 0.1 wt.%. If the stream is an aqueous stream, it will typically be found at a temperature of about 5° C. to 40° C. and at atmospheric pressures. The types of organic contaminants which will typically be found in industrial waste water streams include organic solvents, such as benzene, methyl ethyl ketone, naphthalene, pyrene, anthracene, acenaphthylene, phenanthrene, chrysene, fluroanthene, fluorene, benzopyrene, benzoanthracene, benzofluoranthene, indenopyrene, dibenzoanthracene, benzoparylene and the like. In addition to the above, substituted aromatic hydrocarbons having as ring substituents halogen atoms, such as chlorine or bromine, alkyl groups having from 1 to about 12 carbon atoms, and nitro groups may be removed from said contaminated aqueous streams. Suitable examples of ring-substituted aromatic compounds include halogenated benzenes such as chlorobenzene, bromobenzene, 1,2-dichlorobenzene, 1,3-dibromobenzene, 1,4-dichlorobenzene, 1,2,4-trichlorobenzene, hexachlorobenzene, 2-chloronaphthalene, 2-bromonaphthalene, and 3,3'-dichlorobenzidine among others. Aromatic hydrocarbons having ring-substituted alkyl groups include toluene, ethylbenzene, o-xylene, m-xylene, p-xylene, diphenylmethane, dodecylbenzene, mesitylene, durine, hexamethylbenzene, and the like. It is to be understood that inorganic contaminants, such as inorganic acids, particularly carbonic acid, may also be present in the aqueous stream, as well as in a gaseous stream, and may also be removed by the practice of the present invention.

Aqueous and gaseous streams which are generally found with relatively low levels of organics are those streams which are a by-product of the chemical and petroleum industry. A typical aqueous stream containing such organic contaminants would be an aqueous stream which is generated during the manufacture of various polymeric products. For example, one or more organic contaminants, such as organic solvents, can be released during manufacture, particularly during the curing, of polymer products, and typically end up in a waste water stream. Such contaminants are usually removed by passing the contaminated stream through a bed of solid adsorbent material, such as activated carbon. The contaminants are adsorbed onto the adsorbent, which can then be regenerated by stripping the adsorbent of the contaminant material. Steam is the typical desorbent material. The steam is then condensed, thereby forming an aqueous/organic condensate stream. After a gross physical separation of an organic phase from an aqueous phase, the stream will usually still contain organic moieties, primarily in the form of water soluble, or miscible, compounds.

The graphitic filaments of the present invention are novel high performance materials having a unique set of properties. Such properties include: (i) a surface area from about 50 to 800 $m^2/g$, preferably from about 100 to 700 $m^2/g$, and more preferably from about 250 to 350 $m^2/g$ (ii) an electrical resistivity of about 0.3 to 0.8 $\mu ohm \cdot m$, preferably from about 0.3 to 0.5 $\mu ohm \cdot m$, and more preferably from about 0.3 to 0.4 $\mu ohm \cdot m$; (iii) a crystallinity from about 5% to about 100%, preferably from about 50% to 100%, more preferably from about 75% to 100%, and most preferably from about 90% to 100%; (iv) a length from about 1 $\mu m$ to 100 $\mu m$, preferably from about 10 $\mu m$ to 75 $\mu m$, and most preferably from about 40 $\mu m$ to 60 $\mu m$; and (v) an aspect ratio from about 100 to about 200, preferably from about 125 to 175; (vi) a shape which is selected from the group consisting of straight, branched, spiral, and helical, and (vii) a distance from about 0.335 nm to about 0.700 nm, preferably from about 0.335 nm to about 0.500 nm between the graphite platelets. Further, the surface area of the carbon filaments can be dramatically increased by careful activation with carbon dioxide.

The carbon filaments of the present invention are produced by growing them with the use of a suitable catalyst. The filaments can be grown from unsupported catalytic metal powders or they can grown on a substrate onto which the catalytic metal powder is deposited. Fe, Ni, and Co are the preferred catalysts for producing predominantly straight filaments with graphite platelets that are substantially perpendicular to the longitudinal axis of the filaments. That is, the higher the amount of these metals the more straight the filament will grow. Preferred for straight filaments is to use 100% Fe, Ni, or Co; more preferably Fe. An appropriate Group IB metal-containing alloy catalyst is used for growing predominantly branched, spiral, and helical filaments. In all cases the filaments are grown in the presence of an effective carbon-compound. Non-limiting examples of suitable substrate materials from which the carbon filaments may be grown include: carbon, particularly carbon fibers; oxides such as alumina and silica; carbides, such as silicon carbide; nitrides, such as silicon nitride; and metallic substrates, such as a metallic wire, mesh, or screen. It is preferred that the substrate be in a form selected from the group consisting of a sheet, a fiber, and a powder. If a metallic substrate is used from which the filaments of the present invention are grown, it is preferred that the metal not be one in which carbon can be readily dissolved. Preferred metals include Ti and Al. It is also within the scope of the present invention that a mixture of metal powders be used. One component of the mixture can be catalyst particles of the present invention from which the carbon filaments are grown. The other component, or components, can be non-catalytic metallic and/or ceramic particles.

A particularly preferred substrate material is carbon fiber. When the carbon filaments are grown from carbon fibers, the entire carbon fiber/filament structure can be used in the form of a woven or nonwoven mat through which the contaminated stream is passed. If it is desired to produce only the carbon filaments, they can be grown unsupported directly from the catalyst powder particles. They can also be grown from a refractory material such as an alumina or silica substrate, whereupon the resulting filaments are collected. That is, they are physically separated from the substrate, preferably by scraping them from the surface of the substrate.

Although any carbon fiber material can be used in the practice of the present invention from which carbon filaments are grown, the so-called high performance carbon fibers are preferred. Suitable high performance carbon fibers include those prepared by any appropriate conventional method. Non-limiting methods for producing such fibers include the so-called PAN method, the exmesophase method, and the vapor-deposition method. Of course, any other appropriate method for producing such fibers can be used.

High performance fibers are sometimes referred to by type. For example, HT-type carbon fibers generally have a tensile strength above 3000 MPa and a ratio of strength to stiffness of about 1.5 to 2%. This type of fiber is sometimes not referred to as a carbon fiber because it consists of high carbonaceous polyheteroaromatics with up to 7% nitrogen. Another type of carbon fiber is the HM-type which consists of pure carbon and which generally has a modulus of elasticity value, in the fiber direction, larger than about 30% of the elastic number $C_{11}$ of a graphite single crystal, but with a ratio of tensile strength to tensile modulus below 1%. Furthermore, they are generally commercially available with a modulus up to about 500 GPa, but can be cultivated to even higher stiffness; however, the strength is mostly limited to values below about 3000 MPa. Another type of carbon fiber is the HF-type which has a relatively high tensile strength, generally above about 3000 MPa, with a modulus which does not exceed about 250 GPa. It has recently been found that intermediate types (IM) can be produced with the high strength of the HF-type, but with a Young's modulus of up to about 350 GPa.

Catalysts suitable for use in the practice of the present invention for growing branched, spiral, and helical carbon filaments are alloys comprised of a first metal selected from the metals of Group IB of the Periodic Table of the Elements, and a second metal selected from the group consisting of Fe, Ni, Co, Zn, or mixtures thereof. Group IB metals are Cu, Ag, and Au. Preferred are Cu and Ag with Cu being the most preferred. The Group IB metals is present in an amount ranging from about 5 to 95 at. % (atomic %). A third metal may also be present and is selected from the group consisting of Ti, W, Sn and Ta. When a third is present, it is substituted for up to about 10 at. %, preferably up to about 5 at. %, of the second metal. It is preferred that the catalyst be comprised of copper alloyed with Ni, Co, or Fe. More preferred is copper alloyed with Fe and Ni from an economic point of view. That is, an alloy in which Fe is used in place of some of the Ni would be less expensive than an alloy comprised of Cu alloyed only with Ni.

The structural forms of the filaments of the present invention can be controlled to a limited degree by the practice of the present invention. For example, use of a catalyst which is comprised from only Fe will produce predominantly straight filaments having its graphite platelets substantially perpendicularly to the longitudinal axis of the filaments. The distance between the platelets will be substantially at the theoretical limit of 0.335 nm. Catalysts having a high copper content will generate predominantly helical filaments having a relatively low crystallinity. By high copper content we mean an alloy containing from about 70 to 95 at. % copper, based on the total weight of the alloy. Lower concentrations of copper, e.g., 5 to 30 at. % have a tendency to produce spiral and branched filaments, whereas an alloy with about 50 at. % copper will produce predominantly branched filaments. Also, by predominantly, or substantially all spiral, helical, and/or branched, as used herein, means that after filament growth, there are no more than about 20%, preferably no more than about 10%, and more preferably no more than about 5 wt. % of straight filaments among the spiral, helical and branched filaments.

The catalyst used to produce the filaments of the present invention can be either used in an unsupported state or they can be deposited onto a substrate by any appropriate technique. Non-limiting examples of such techniques include incipient wetness, vaporization, and electrolytic deposition if the substrate is conducting. A typical incipient wetness technique includes dissolving salts of each metal of the alloy in an appropriate solvent, then impregnating the substrate, for example, carbon fibers, with the salt solution. The impregnated substrate is then dried at a temperature greater than 100° C., preferably from about 105° C. to about 120° C., and more preferably at about 110° C. After drying they are calcined at a temperature from about 200° to 300° C., preferably from about 200° to about 250° C., thereby converting the individual metals to their respective oxide form. The so treated substrate is then heated, in a hydrogen containing atmosphere, at a temperature from about 400° to about 600° C., preferably from about 450° to 550° C., for an effective amount of time, to produce the catalyst in an alloy form. By effective amount of time, we mean that amount of time needed to reduce substantially all of the metal oxides to the respective alloy having a suitable particle size. Suitable particle sizes are from about 25 A to about 1500 A, preferably from about 50 A to about 1000 A, and more preferably from about 50 A to about 200 A.

Metal salts suitable for use in the present invention are salts which are soluble in water, as well as in organic solvents. Non-limiting examples of water soluble salts suitable for use herein include nitrates, sulfates and chlorides. Non-limiting examples of salts soluble in organic solvents, which are suitable for use herein include formates, acetates, and oxalates. Preferred are the organic soluble salts because the substrate, if carbon fibers for use as a reinforcing material, would not have to be pretreated. However, if the substrate is a ceramic oxide, nitride, or boride, water soluble salts would be preferred. Non-limiting examples of organic solvents which are suitable for use herein include alcohols, such as methanol, ethanol, propanol, and butanol; ketones, such as acetone; acetates and esters; and aromatics, such as benzene and toluene.

When an aqueous solution of metal salt is used, it is preferred that the surface of the substrate, if carbon fibers, be pretreated to make the surface more acceptable to the catalyst. One preferred method of pretreating the carbon fibers is to oxygenate the fiber surface using atomic oxygen, or a compound that will produce atomic oxygen in a plasma. Although an oxidizing agent, such as nitric acid, can also be used, it is not preferred because it would have a tendency to oxygenate only the defect sites of the surface instead of oxygenating substantially the entire surface as atomic oxygen would. The surface is preferably treated with atomic oxygen for an effective amount of time, at about room temperature (about 22° C.). By effective amount of time, we mean for that amount of time, preferably for that minimum amount of time, needed to oxygenate substantially all of the surfaces of the carbon fibers.

If a vaporization technique is used to deposit the alloy catalyst, volatile metal salts, such as carbonyls, or the elemental metal, is used. Vaporization can be accomplished by any appropriate technique, such as vapor deposition.

The filaments of the present invention are produced by reacting the catalyst in a heating zone with the vapor of a suitable carbon-containing compound for an effective amount of time. By an effective amount of time we mean for that amount of time needed to produce the desired filament structural arrangement. This amount of time will generally be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the catalyst. Generally, this temperature will range from about 500° C. to about 700° C., preferably from about 550° C. to about 650° C., and more preferably from about 550° to about 650° C. Carbon-containing compounds suitable for use in the practice of the present invention are compounds composed mainly of carbon atoms and hydrogen atoms, although carbon monoxide may also be used. The carbon-containing compound, which may be introduced into the heating zone in gaseous form, preferably has no more than 8 carbons, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Most preferred is ethylene.

It may be desirable to have an effective amount of hydrogen present in the heating zone. By an effective amount, we mean that minimum amount of hydrogen which will maintain a clean catalyst (free of carbon residue), but not so much that will cause excessive hydrogasification, or burn-off, of carbon from the filaments and/or fiber structure, if present. Generally, the amount of hydrogen present will range from about 5 to 40 vol. %, preferably from about 10 to 30 vol. %, and more preferably from about 15 to 25 vol. %. Hydrogen serves two competing functions. For example, on the one hand it acts as a cleaning agent for the catalyst, and on the other hand it hydrogasifies, or causes carbon burn-off, of the carbon structure. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. The Cu:Ni is so active that it utilizes essentially all of the carbon deposited thereon to grow filaments, and thus, there is generally no carbon residue to clean off.

After the filaments are grown, it may be desirable to treat the final structure with an aqueous solution of an inorganic acid, such as a mineral acid, to remove any excess catalyst particles. Non-limiting examples of mineral acids which can be used to treat the final structure include sulfuric acid, nitric acid, and hydrochloric acid. Preferred is sulfuric acid.

Figure 1A:
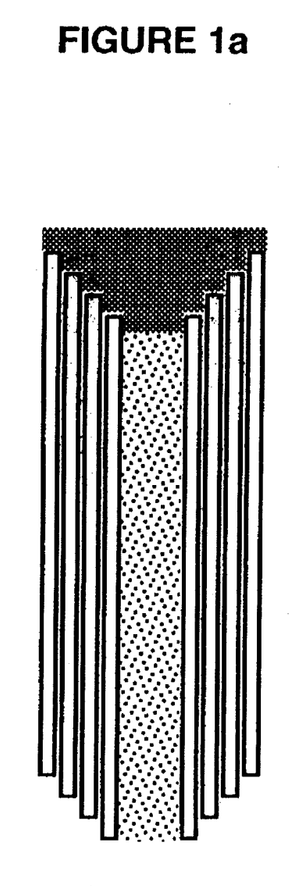
FIG. 1a shows the platelets substantially parallel to the longitudinal axis of the filament.
Figure 1B:
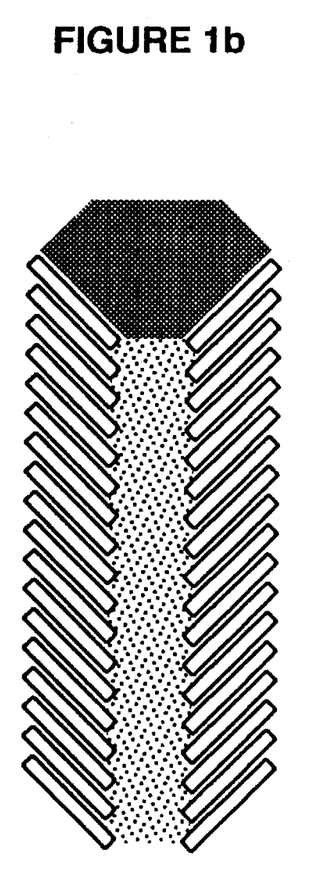
FIG. 1b shows the platelets at an angle to the longitudinal axis of the filament and FIG. 1c shows the platelets substantially perpendicular to the longitudinal axis of the filament.
Figure 1C:
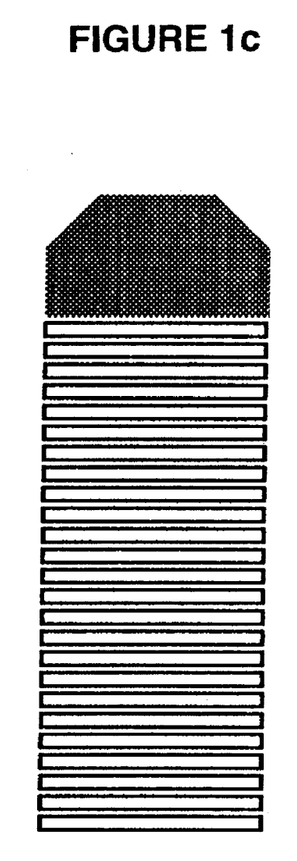
Figure 2A:
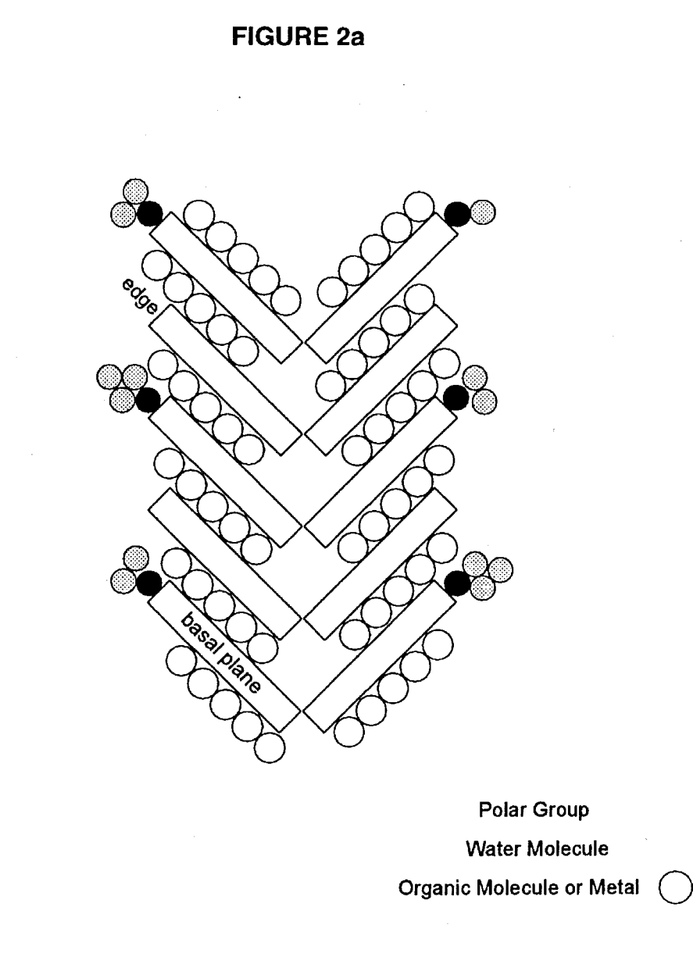
FIG. 2a shows selective adsorption at the edge and basal plane sites of the carbon filaments (nanofibers) of the present invention.
Figure 2B:
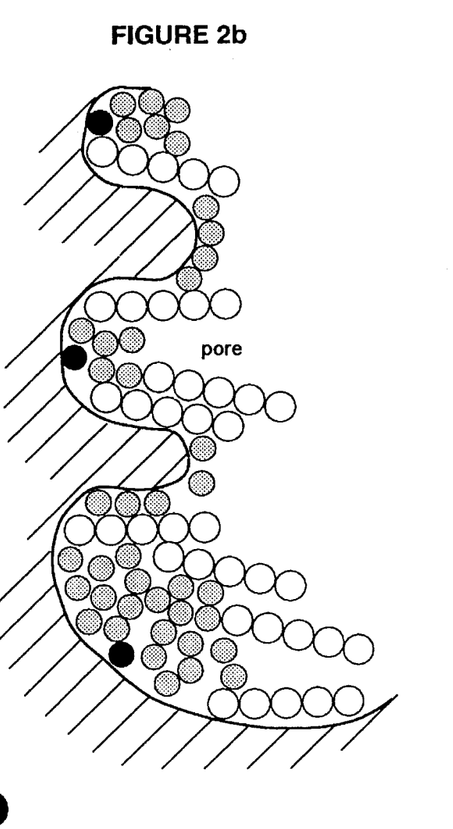
FIG. 2b shows indiscriminate adsorption of both organic and water molecules on activated carbon.

FIGS. 1a and 1b hereof show filament structures as duplex materials. That is, they are comprised of two distinct carbon phases. One phase is composed of the graphite platelets, and the other is less ordered, or disordered carbon phase. Consequently, such platelet arrangements give rise to a conformation possessing a specific pore size, as determined by the distance between the graphite platelets. Furthermore, controlled oxidation, such as in steam or carbon dioxide, will selectively remove the disordered carbon from the central region of the filaments to produce a relatively thinned walled nanotube with relatively large pore volume, while maintaining the desired pore size. It is within the scope of the this invention to increase the spacing between the platelets by any suitable means, such as by intercalation. Intercalation involves incorporating an appropriate intercalation compound between platelets. Intercalation compounds suitable for graphite structures are comprehensively discussed in *Applications of Graphite Intercalation Compounds*, by M. Inagaki, Journal of Material Research, Vol 4, No.6, November/December 1989, which is incorporated herein by reference. The preferred intercalation compounds for use with the filaments of the present invention are alkali and alkaline-earth metals when used in a reducing atmosphere. The limit to which the platelet spacing will be increased for purposes of the present invention will be that point wherein the carbon filaments no longer can be characterized as graphitic. That is, the spacing can become so large the carbon now has properties more like amorphous carbon instead of graphite. It is important for the practice of the present invention that the carbon filaments maintain the basal plane structure representative of graphite.

If the substrate is carbon fibers, it is not necessary to use carbon fibers which have been first graphitized. That is, non-graphitized carbon fibers may be used and after the carbon filaments have been grown therefrom, the entire structure can then be graphitized. The entire structure can be graphitized by heating the structure in an inert atmosphere, preferably argon, at a temperature of about 2500° C. for enough time to cause the structure to become graphitized. It is preferred that the carbon structure have a crystallinity greater than about 25%, more preferably greater than about 50%, and most preferably greater than about 75%. Crystallinites greater than about 80% and 90% are also preferred, particularly crystallinites up to about to about 100%. Crystallinity can be measured by any appropriate technique. Such techniques include resistivity, as set forth in Example 5 hereof, and oxidation measurements, as set forth in Example 6 hereof. Such techniques are well known to those skilled in the art and further elaboration is not needed for the purposes of the present invention.

The matrix component employed in the practice of the present invention can be any of the plastics suitable for use in high performance carbon fiber/matrix composites. Non-limiting examples of plastics which can be used include thermosetting resins, such as the epoxies, thermoplastic polymers, and modified matrix resins. Typically, thermoplastic polymers are more advantageous to process and they generally show much higher toughness than composites containing brittle thermosetting resins. Typical thermoplastic resins include epoxy bismaleimides, polyamide-imide (PAI), polyphenylene sulfide (PPS), polysulfone (PS), polyethesulfone (PES), polyetherimide (PEI), polyetheretherketone (PEEK), and polytetrafluoro-ethylene (PTFE). However, some properties show disadvantages, such as creep resistance which reduces dynamic loading. This is due to the cross-linked nature of the linear thermoplastic polymer. In addition, pitch derived from petroleum, coal, or any other suitable organic precursor molecules, or extracted therefrom can be used as the matrix component. The resulting composite would then be referred to as a carbon-carbon composite.

One of the advantages of the graphitic filaments of the present invention when compared to activated carbon is that the instant graphitic filaments are substantially more selective for the adsorption of organic molecules. This is primarily due to the relatively low polarity of the graphitic platelets. Consequently, the graphitic filaments of the present invention will have a substantially longer lifetime on stream and will be more efficient for the removal of contaminants from streams than activated carbon. In fact, the graphitic filaments of the present invention are bifunctional whereas activated carbon is not. By bifunctional we mean that the edges of the graphite platelets are polar whereas the basal planes are substantially non-polar. Activated carbon is not graphitic and thus is not bifunctional—it can be either polar or non-polar but not both.

Contaminants can be removed from contaminated streams by contacting the carbon filaments of the present invention in any suitable way. For example, the contaminated stream can be passed through a fixed-bed of individual filaments or filaments attached to fibers, preferably carbon fibers and metallic fibers. The term "metallic fiber" as used herein also refers to conventional metal wire. The filaments can also be contained in a porous container and either placed in the contaminated medium or the contaminated medium can passed through the porous container containing the filaments. The term "porous container" as used herein refers to any appropriate containing means through which the contaminated water will pass, but not the carbon filaments. The containing means can be of any suitable material and construction. For example, is may be made from a metal or ceramic material and be of a redid construction. It may also be made from a fabric like material and be flexible. The particular containing means will vary depending how the carbon filaments will be used to remove contaminants.

If a fixed-bed of filaments is used, it can sit in any suitable vessel through which the contaminated stream is passed. It would most likely be preferred in commercial practice to pass the contaminated stream through a series of two or more fixed-beds of filament-containing material. Each fixed-bed can be in an individual vessel or two or more fixed-beds can be staged in a single vessel. If two or more beds of filaments are used, then the process can be continuous so that each bed can separately taken off stream for regeneration. The stream will then be serially passed to the other vessels on stream. For example, the bed of filaments in the first vessels in the series will typically be the first to become saturated with contaminants. The vessel containing this first bed can be taken off-line and regenerated while the stream continues to be passed to the other vessels which remain on line.

The filament-containing adsorbent can be regenerated by any appropriate means. Non-limiting examples of means for regenerating the adsorbents of the present invention include: (i) heating to the decomposition temperature of the organic contaminant; (ii) solvent extraction where environmentally feasible; and distillation to remove volatile organic components.

The fixed-bed may be in the form of porous device, such as a mat, screen, or mesh, and the like. For example, it can be a woven or nonwoven mat of fiber material onto which is grown the filaments. If the filaments are grown on a metallic fiber or wire, such as a copper wire, an electrical current can be passed through the wire to aid in the removal of metallic contaminants from the stream. The stream can be passed through a series of filament-containing porous mats or containers and as each mat becomes saturated with contaminants it can be removed and replaced with a fresh or regenerated mat. The porous mat can also be comprised of activated carbon and carbon fibers onto which are grown the carbon filaments. Such a mat could be produced by encasing the fiber/filament structure in a matrix of polymeric material which can then be carbonzied. The polymeric matrix material will act as the precursor for the activated carbon. It is also within the scope of the present invention to first encase the filaments themselves in a polymeric material, then carbonize the resulting composite. This will produce a carbon product which is comprised of both the carbon filaments of the present invention as well as activated carbon. The polymeric material will act as the precursor for the activated carbon.

It is also within the scope of the present invention that the edges of the graphite platelets be etched with an appropriate etching agent, preferably an alkali or alkaline-earth metal in an oxidizing atmosphere. The filaments of the present invention are also suitable for the storage of small gas molecules, such as $H_2$, which can be stored between the platelets. They may also be suitable for the separation of gases. That is, oxygen from nitrogen.

The present invention will be illustrated in more detail with reference to the following examples, which should not be construed to be limiting in scope of the present invention.

EXAMPLE 1

A series of runs were conducted using 100 mg samples of a copper:nickel alloy powder (Cu:Ni ratio 3:7). Each sample was placed in a two inch diameter fused silica reactor tube at room temperature (about 22° C.) and then heated to a temperature of 350° in a 10% hydrogen/helium mixture at a flow rate of 100 standard cubic centimeters per minute (sccm) in a clam shell type electric furnace. These conditions were maintained for 30 minutes at which time the hydrogen flow was cut-off and the sample brought to the desired reaction temperature in the presence of helium alone. Upon reaching the desired reaction temperature, the helium was replaced by a flow of ethylene (100 sccm) and the reaction was allowed to proceed for 90 minutes. Following this procedure, ethylene was replaced by helium and the sample cooled to room temperature and reweighed to determine the amount of carbon produced. The weight changes of the samples are shown in Table I below.

TABLE I

Effect of Temperature on Carbon Filament Formation
From Interaction of Cu:Ni (3:7) with Ethylene

| Sample | Temperature °C. | % Carbon Yield |
|---|---|---|
| a | 300 | 0 |
| b | 400 | 0 |
| c | 450 | 0 |
| d | 500 | 19 |
| e | 550 | 57 |
| f | 600 | 66 |
| g | 650 | 68 |
| h | 700 | 69 |
| i | 720 | 0 |
| j | 750 | 0 |

Subsequent examination of the carbon deposits in a scanning electron microscope showed that the carbon consisted entirely of filamentous form.

EXAMPLE 2

The experimental procedure of Example 1 was followed except that the composition of the copper:nickel alloy powders was varied from 80:20 to 0:100 and the reaction temperature maintained at 650° C. The weight changes due to carbon formation on the alloy powders are shown in Table II below.

TABLE II

Effect of Catalyst Composition on the Production of
Carbon Filaments

| Catalyst Composition Cu:Ni Ratio | % Carbon Yield |
|---|---|
| 80:20 | 9.8 |
| 70:30 | 59.6 |
| 50:50 | 71.0 |
| 30:70 | 69.2 |
| 20:80 | 63.7 |
| 10:90 | 54.3 |
| 0:100 | 31.1 |

EXAMPLE 3

The experimental procedure used in Example 1 was followed in all respects, except the reaction time was varied from 0.5 to 8 hours and the reaction temperature was maintained at 600° C. The weight changes due to carbon formation on the alloy powders are shown in Table III below.

TABLE III

Effect of Reaction Time on Carbon Filament Yield

| Reaction Time (Hrs.) | % Carbon Yield |
| --- | --- |
| 0.5 | 59.5 |
| 1.0 | 67.3 |
| 1.5 | 66.0 |
| 2.0 | 62.4 |
| 3.0 | 58.7 |
| 4.0 | 56.9 |
| 5.0 | 57.8 |
| 6.0 | 56.1 |
| 8.0 | 50.2 |

EXAMPLE 4

In a series of comparison experiments, 100 mg of iron and nickel and various alloys of these metals were placed in the reactor system described in Example 1 and then initially heated in a 10% hydrogen/helium mixture (100 sccm) at 350° C. for 30 minutes. Following this treatment the samples were brought to a temperature of 600° C. in helium. The inert gas was removed from the system and the samples reacted in ethylene/hydrogen environment where the ratio of hydrocarbon/hydrogen was systematically varied from 100/0 to 10/90 for a constant reaction of 1.5 hours. The data obtained from these experiments is presented in Table IV.

TABLE IV

% Carbon Yield From Various Catalysts As a Function of Ethylene/Hydrogen Ratio

| Catalyst | % CARBON YIELD ETHYLENE/HYDROGEN RATIO | | | | | | |
| --- | --- | --- | --- | --- | --- | --- | --- |
|  | 100:0 | 4:1 | 2:1 | 1:1 | 1:2 | 1:4 | 1:9 |
| Nickel | 0 | 1.7 | 7.4 | 44.2 | 32.8 | 31.6 | — |
| Copper-Nickel (3:7) | 74.3 | 66.5 | 65.5 | 57.9 | 42.3 | 26.8 | 17.1 |
| Copper-Nickel (1:1) | 69.6 | — | — | 62.7 | 53.2 | 26.8 | — |
| Iron | 0 | 0.2 | 0.5 | 1.0 | 1.5 | 2.0 | — |
| Copper-Iron (3:7) | 0 | 3.3 | 6.4 | 60.7 | 52.8 | 27.1 | — |
| Silver-Iron (3:7) | 1.0 | 39.0 | — | 40.3 | — | 51.9 | — |
| Nickel-Iron (8:2) | 62.3 | 67.3 | — | 70.8 | — | 66.1 | — |
| Nickel-Iron (1:1) | 1.0 | 4.0 | — | 16.9 | — | 50.2 | 51.2 |
| Nickel-Iron-Copper (7:12:1) | 64.1 | 63.4 | 68.4 | 68.6 | 65.7 | 63.3 | 44.6 |

EXAMPLE 5

Resistivity measurements of samples of carbon filaments prepared according to the procedure outlined in Example 1, were compared with those of other materials in an attempt to determine the graphitic nature of the filaments as a function of the catalyst composition. The relative values obtained are presented in Table V.

TABLE V

Comparison of the Electrical Resistivities Of Carbon With Various Cu/Ni Alloys

| ALLOY COMPOSITION Cu:Ni | RELATIVE RESISTIVITY ohms-cm |
| --- | --- |
| 0:100 | 4.43 |
| 5:95 | 4.25 |
| 10:90 | 3.65 |
| 20:80 | 3.27 |
| 30:70 | 4.02 |
| 85:15 | 6.75 |
| Graphite | 1.76 |
| Active Carbon (DARCO KB)* | $3.26 \times 10^3$ |
| Alumina | $4.2 \times 10^6$ |

* = Active carbon available from Norit Carbon Co.

EXAMPLE 6

In another series of characterization studies, 50 mg of carbon filaments produced from various catalyst compositions were gasified in carbon dioxide using a thermogravimetric technique. Samples of carbon filaments were prepared as described in Example 1 and heated at a constant rate in carbon dioxide up to 1000° C. and changes in weight recorded as a function of reaction time. In a parallel set of experiments, samples of SP-1 graphite were also gasified in carbon dioxide using copper:nickel alloys of identical composition to that present in carbon filaments and were used as reference. SP-1 graphite is a spectrographically pure graphite available from Union Carbide Co. A synopsis of the data is given in Table VI.

TABLE VI

Reactivity of Carbon Filaments to $CO_2$ As a Function of Catalyst Composition

| Catalyst | Type of Carbon | TEMPERATURE °C. | | | | | | | |
| --- | --- | --- | --- | --- | --- | --- | --- | --- | --- |
|  |  | 650 | 700 | 750 | 800 | 850 | 900 | 950 | 1000 |
| Ni | Filaments | 19.8 | 47.7 | 88.6 | 97.7 |  |  |  |  |
|  | Graphite |  |  | 15.5 | 53.6 | 88.7 | 97.4 |  |  |
| Cu:Ni (1:9) | Filaments |  |  |  | 10.0 | 65.8 | 83.3 | 90.8 |  |
|  | Graphite |  |  |  | 26.3 | 51.6 | 78.9 | 92.7 |  |

TABLE VI-continued

Reactivity of Carbon Filaments to $CO_2$
As a Function of Catalyst Composition

| Catalyst | Type of Carbon | TEMPERATURE °C. | | | | | | | |
|---|---|---|---|---|---|---|---|---|---|
| | | 650 | 700 | 750 | 800 | 850 | 900 | 950 | 1000 |
| Cu:Ni | Filaments | | | 7.7 | 46.2 | 63.8 | 80.0 | 93.7 | |
| (2:8) | Graphite | | | 7.4 | 21.3 | 42.6 | 70.2 | 88.3 | |
| Cu:Ni | Filaments | | 2.9 | 6.7 | 17.3 | 41.3 | 72.1 | 88.5 | |
| (5:5) | Graphite | | | 6.5 | 16.2 | 30.3 | 50.3 | 67.6 | |
| Cu:Ni | Filaments | | 1.0 | 5.0 | 15.0 | 38.6 | 68.0 | 88.0 | |
| (7:3) | Graphite | | | 2.0 | 2.5 | 3.0 | 7.2 | 14.4 | |

From this data, we can conclude that filaments produced from copper:nickel alloys containing a high fraction of nickel exhibit gasification characteristics which are similar to that found in graphite, i.e. such filaments contain a large fraction of graphite.

EXAMPLE 7

In another series of experiments 5 wt. % of catalyst, consisting of various ratios of copper and nickel were deposited onto carbon fibers (T-300). This carbon fiber supported catalyst system was initially calcined in air at 300° C. for 0.5 hours and then reduced in hydrogen at 300° C. for 1 hour. Following this treatment the supported catalyst was reacted in the apparatus described in Example 1 in an ethylene/hydrogen (1:1) mixture at 600° C. for 2.0 hours after reaction the samples were cooled to room temperature in helium and the yield of carbon filaments formed in the parent fibers determined by weight difference, and the values recorded in Table VII.

TABLE VII

EFFECT OF CATALYST COMPOSITION ON
THE PRODUCTION OF CARBON FILAMENTS ON
CARBON FIBERS

| Catalyst Composition Cu:Ni Ratio | Grams of Carbon Deposited |
|---|---|
| 80:20 | 0.017 |
| 50:50 | 0.225 |
| 20:80 | 0.460 |
| 10:90 | 0.502 |
| 0:100 | 0.355 |

EXAMPLE 8

Samples were produced in a similar manner to that described in Example 7 except that the catalyst composition was maintained constant at copper:nickel (3:7) and the formation of filaments was examined as a function of the carbon fiber type. The results are condensed in Table VIII.

TABLE VIII

| Carbon Fiber* | Young Modulus | Grams of Carbon Deposited |
|---|---|---|
| P-25 | 150 | 0.529 |
| T-300 | 231 | 0.496 |
| T-50 | 379 | 0.527 |
| P-55 | 380 | 0.548 |
| P-75 | 517 | 0.491 |
| P-100 | 690 | 0.505 |

TABLE VIII-continued

| Carbon Fiber* | Young Modulus | Grams of Carbon Deposited |
|---|---|---|
| P-120 | 820 | 0.464 |

*These carbon fibers are available from Amoco Chemical Co. under the designations set forth in this column.

EXAMPLE 9

Straight filaments can be produced from the interaction of iron with a reactant comprising a mixture of carbon monoxide, ethylene, and hydrogen at a temperature between 500° and 1100° C. Optimum yields of filaments were found at 600° C. from a gas mixture of the composition ethylene, carbon monoxide, and hydrogen (3:1:1). It was found from high resolution transmission electron microscopy studies that when the catalyst was in the form of unsupported iron powder the filamentous structures produced had a stacking arrangement in which the graphite platelets were oriented substantially perpendicular to the axis of the filaments. The measured spacing between the graphite platelets was 0.335 nm. If the iron was dispersed on a suitable support medium, such as graphite, silica, or γ-alumina, the structure of the filaments was one in which the graphite platelets were aligned in a direction substantially parallel to the axis of the filament.

Table IX below shows the effect of gas composition on the yield of straight carbon filaments from the interaction of $C_2H_4$—CO—$H_2$ with unsupported iron powder at 600° C. and 60 minutes.

TABLE IX

| $C_2H_4$—CO—$H_2$ Molar Ratio | % Carbon Filament Yield |
|---|---|
| 80:0:20 | 0.51 |
| 73:7:20 | 20.3 |
| 68:12:20 | 50.3 |
| 60:20:20 | 68.1 |
| 38:42:20 | 67.9 |
| 17:63:20 | 45.9 |
| 0:80:20 | 21.9 |

It will be noted that Fe alone has good catalytic properties for producing the filaments of the present invention when the gas composition contains CO. This will be compared with the data in Table IV hereof where Fe had no catalytic effect when the gas composition was only ethylene and hydrogen.

What is claimed is:
1. A process for removing contaminants from aqueous and gaseous streams, which process comprises contacting the contaminated stream with a carbon filaments characterized as having; (i) a surface area from about 50 to 800 m$^2$/g, (ii) an electrical resistivity from about 0.3 µohm·m to 0.8 µohm·m, (iii) a crystallinity from about 5% to about 100%, (iv) a length from about 1 µm to about 100 µm; and (v) a distance from about 0.335 nm to about 0.700 nm between graphite platelets.

2. The process of claim 1 wherein the contaminants are selected from organic and metal components.

3. The process of claim 2 herein the filaments of the present invention are characterized by having a surface area from about 100 m$^2$/g to about 700 m$^2$/g; and a crystallinity from about 50% to about 100%.

4. The process of claim 3 wherein the crystallinity of the filaments is from about 75% to 100%.

5. The process of claim 4 wherein the crystallinity of the filaments is from about 90% to 100%.

6. The process of claim 1 wherein the distance between graphite platelets is from about 0.335 nm to 0.500 nm.

7. The process of claim 5 wherein the average distance between the graphite platelets is from about 0.335 nm to about 0.500 nm.

8. The process of claim 1 wherein the filaments are of a shape selected from branched, spiral, and helical.

9. The process of claim 7 wherein the filaments are of a shape selected from branched, spiral, and helical.

10. The process of claim 1 wherein the stream is an aqueous stream.

11. The process of claim 1 wherein the stream is a gaseous stream.

12. The process of claim 1 wherein the filaments are in a porous container when they are contacted by the stream.

13. The process of claim 1 wherein the stream is contacted with a structure comprised of said filaments grown from a fiber.

14. The process of claim 13 wherein the fiber is a carbon fiber.

15. The process of claim 13 fiber is a metal fiber and the metal is selected from Al and Ti.

16. A process for removing contaminants selected from the groups consisting of organic and metallics from aqueous and gaseous streams, which process comprises: (a) contacting the contaminated stream with a carbon filaments characterized as having; (i) a surface area from about 50 to 800 m$^2$/g, (ii) an electrical resistivity from about 0.3 µohm·m to 0.8 µohm·m, (iii) a crystallinity from about 5% to about 100%, (iv) a length from about 1 µm to about 100 µm; and (v) a distance from about 0.335 nm to about 0.700 nm between graphite platelets, thereby adsorbing contaminants onto said filaments; and (b) regenerating the filaments after saturation of contaminants by a technique selected from: heating to the decomposition temperature of the contaminants; and extracting the contaminants with an effective solvent.

17. The process of claim 16 wherein the contaminated stream is an aqueous stream.

18. The process of claim 16 wherein the contaminated stream is a gaseous stream.

19. The process of claim 16 wherein the crystallinity of the filaments is from about 50% to 90% and the distance between graphite platelets is from about 0.335 nm to about 0.500 nm.

20. The process of claim 19 wherein the crystallinity is from about 90% to 100%.

* * * * *